United States Patent [19]

Yamamoto et al.

[11] Patent Number: 5,203,913
[45] Date of Patent: Apr. 20, 1993

[54] ERASABLE AQUEOUS INK COMPOSITION

[75] Inventors: Hiroyoshi Yamamoto, Kobe; Shingo Uzukawa, Kashiwara, both of Japan

[73] Assignee: Sakura Color Products Corporation, Japan

[21] Appl. No.: 768,214

[22] PCT Filed: Feb. 13, 1991

[86] PCT No: PCT/JP91/00168
§ 371 Date: Oct. 11, 1991
§ 102(e) Date: Oct. 11, 1991

[30] Foreign Application Priority Data

Feb. 13, 1990 [JP] Japan .................. 2-33406

[51] Int. Cl.$^5$ .................................. C09D 11/16
[52] U.S. Cl. .................. 106/22 B; 106/20 A; 106/30 R; 106/32.5
[58] Field of Search .......... 106/20, 22, 30, 32.5

[56] References Cited

U.S. PATENT DOCUMENTS

| | | | |
|---|---|---|---|
| 3,912,520 | 10/1975 | Miyajima et al. | 106/32 |
| 3,922,457 | 11/1975 | Barnwell et al. | 106/32.5 |
| 4,097,289 | 6/1978 | Hofmann et al. | 106/30 |
| 4,256,492 | 3/1981 | Matsumoto et al. | 106/23 |
| 4,557,618 | 12/1985 | Iwata et al. | 106/20 |
| 4,578,117 | 3/1986 | Nakanishi | 106/20 |
| 4,740,549 | 4/1988 | Okuzono et al. | 106/22 |
| 4,940,628 | 7/1990 | Lin et al. | 106/32.5 |
| 4,954,174 | 9/1990 | Imagawa | 106/32.5 |
| 4,988,123 | 1/1991 | Lin et al. | 106/20 |

FOREIGN PATENT DOCUMENTS

| | | |
|---|---|---|
| 30772 | 2/1982 | Japan . |
| 55176 | 3/1986 | Japan . |
| 200180 | 9/1986 | Japan . |
| 38474 | 2/1990 | Japan . |

Primary Examiner—Mark L. Bell
Assistant Examiner—Helene Klemanski
Attorney, Agent, or Firm—Larson and Taylor

[57] ABSTRACT

The invention provides an erasable aqueous ink composition comprising, based on the total weight of the ink composition, 3 to 50% of a resin having a minimum film-forming temperature of not lower than 40° C., 0.01 to 10% of a water-insoluble dye, 0.5 to 50% of a water-soluble organic solvent and 20 to 60% of water.

4 Claims, No Drawings

ERASABLE AQUEOUS INK COMPOSITION

FIELD OF THE INVENTION

The present invention relates to an ink composition and more particularly to an ink composition which can be erased with a rubber eraser after writing.

The terms percentages and parts used herein are all by weight.

BACKGROUND ART

Ink compositions which are erasable with a rubber eraser after writing (hereinafter referred to as "erasable inks") are known. For example, Japanese Unexamined Patent Publication No. Sho 59-223769 discloses "an ink composition which comprises a pigment selected from carbon black and aniline black and homogeneously dispersed in an aqueous medium having dissolved therein polyethylene oxide in the presence of a surfactant containing a polyoxyethylene group." The disclosed erasable ink, however, is poor in stability, unsatisfactory in erasability itself and difficult to erase after the lapse of long term.

Japanese Patent Application No. Hei 1-217088 filed by the present applicant discloses "an ink composition which is erasable with a rubber eraser, comprising 1 to 50% of a pigment, 3 to 50% of a resin having a film-forming temperature of not lower than 40° C., 0.5 to 50% of an organic solvent and 7 to 60% of water, based on the total weight of the ink composition". The above ink (which may be hereinafter referred to as "ink of prior invention") is markedly superior to conventional erasable inks in, e.g. flowability, erasability and stability. Yet the ink of prior invention tends to have a slightly low stability to dispersion over a long term because a pigment is used as a coloring agent. More specifically, if a ball-point pen filled with the above ink has been left to stand upright, the ink fed to the substrate for writing may become blurred due to the sedimentation of pigment.

DISCLOSURE OF THE INVENTION

In view of the foregoing current state of prior art, the present inventors conducted extensive research and found that a composition containing a resin having a specific minimum film-forming temperature and a water-insoluble dye can pronouncedly alleviate the problems of conventional erasable inks.

The present invention provides "an erasable aqueous ink composition comprising, based on the total weight of the ink composition, 3 to 50% of a resin having a minimum film-forming temperature of not lower than 40° C., 0.01 to 10% of a water-insoluble dye, 0.5 to 50% of a water-soluble organic solvent and 20 to 60% of water."

The resin component to be used for the erasable ink of the invention is selected from acrylic resins, acryl-styrene type copolymer resins, ethylene-vinyl acetate-vinyl chloride type copolymer resins, acryl-vinyl acetate type copolymer resins, styrene-type resins and the like which have a minimum (lowest) film-forming temperature (MFT) of not lower than 40° C. Resin components having a minimum film-forming temperature of not lower than 50° C. are preferred. When the resin component used has a minimum film-forming temperature of lower than 40° C., a resin film is formed at room temperature or due to the heat evolved on erasure by a rubber eraser, whereby the written marks become difficult to erase with an eraser because of the adhesion between the written marks and the paper. Since these resins are usually commercially available in the form of an emulsion in a solids concentration of about 30 to about 60%, the resin can be used as it is in the manufacture of inks. When required, two or more resins can be used in mixture as the resin component.

Critically the dye to be used for the erasable ink of the invention is insoluble in water. The water-insoluble dye is present as firmly bonded to the resin component in the ink composition. If a water-soluble dye is used in place of the water-insoluble dye in the invention, the water-soluble dye would be dissolved in the water component of the ink and would dye the fibers of the paper or other substrates after writing. In this case, even if an attempt is made to erase the written marks with an eraser, the remaining dye would prevent the complete decolorization of substrate although the layer of written marks would be wiped out. Examples of water-insoluble dyes usable in the invention are given below as designated with color index (CI) numbers. The dyes useful in the invention, however, are not limited thereto insofar as the dyes are insoluble in water.

(a) Solvent Yellow 14, 16, 21
(b) Solvent Orange 45, 62
(c) Solvent Red 1, 7, 8, 119, 125
(d) Solvent Blue 5, 14, 25
(e) Solvent Black 5, 34

Two or more of these water-insoluble dyes can be used in mixture. Therefore according to the invention, inks with substantially any desired color can be produced by regulating the proportions of two or more of dyes to be used.

Water-soluble organic solvents usable for the erasable inks of the invention are not specifically limited and include those conventionally used for writing inks. Specific examples of useful organic solvents are alkylene glycols such as ethylene glycol, propylene glycol and hexylene glycol; dialkylene glycols such as diethylene glycol and dipropylene glycol; polyalkylene glycols such as polyethylene glycol and polypropylene glycol; glycerins; etc. When required, at least two of these solvents can be used in mixture.

The components for the erasable ink of the invention are essentially used in the following proportions shown based on the total weight of the ink.

The amount of the resin component is 3 to 50%, preferably 20 to 45%, calculated as solids. When less than 3% of the resin component is used, an insufficient water-insoluble dye is bonded to the resin component so that the ink would be given a pale color. The insufficiency of resin component used would lead to shortage of particulate resin layer formed on the written marks, resulting in failure to completely remove the written marks by the elimination of particulate resin layer. On the other hand, when more than 50% of the resin component is used, the ink is rendered too viscous and becomes difficult to flow out of the ink container. Especially if the ink container is left with the lid removed, the water and the organic solvent would evaporate off, thereby making the tendency more pronounced.

The amount of the water-soluble organic solvent is 0.5 to 50%, preferably 5 to 30%. When less than 0.5% of the organic solvent is used, the ink is likely to dry and thereby solidify on the tip of a writing device such as felt-tipped pens with the cap taken off (poor in the so-called "cap-off properties"). Reversely when more than 50% of the water-soluble organic solvent is used, the written marks become slow in drying and the ink penetrates into the paper to a greater extent, so that the dye bonded to the resin component is dissolved out to penetrate deep into the fibers of the paper or other substrates, making complete removal difficult.

The amount of the water inclusive of the water present in the resin component used in the form of an emulsion is 20 to 60%. When more water is needed in addition to the water present in the emulsion, ion exchange water is used.

The erasable ink of the invention can be prepared by any optional process which enables the ink components to uniformly disperse, more specifically, as by the following process. The water-insoluble dye is mixed with stirring with the resin emulsion to thereby obtain a dyed resin emulsion base. Then the unreacted excess dye is precipitated and removed by centrifuging, filtration or like means. Thereafter the water-soluble organic solvent and, when required, water are added to the supernatant and the mixture is stirred, whereby the desired ink is produced.

The erasable ink of the invention may contain additives conventionally used for inks. Examples of useful additives are pH-adjusting agents, antiseptic agents, mildewproofing agents, etc.

EFFECTS OF THE INVENTION

The erasable ink of the invention can achieve the following remarkable results.

(1) The erasable ink of the invention can exhibit a high storage stability even in a state of low viscosity (about 3 to about 100 cps) over a long term. Therefore the ink of the invention can be used for a wide variety of writing devices such as felt-tipped pens, ball-point pens, line markers, plotters, etc. unlike conventional highly viscous erasable inks to be used for writing devices essentially having a pressure-type container.

(2) The erasable ink of the invention can be provided as highly viscous stamp pad inks by using a reduced amount of water and/or water-insoluble organic solvent or adding a thickening agent.

(3) The written marks formed by the erasable ink of the invention can be easily erased with a commercially available rubber eraser and re-writing can be accomplished on the erased surface area of paper.

(4) The erasable ink of the invention is outstanding in long-term stability so that, for example, even if a ball-point pen filled with the ink is left to stand upright with the tip downward, no blur would occur on writing due to the sedimentation of coloring component.

(5) The ink of the invention can be provided with any desired color by regulating the proportions of two or more of water-insoluble dyes to be used.

EXAMPLES

Given below are examples to clarify the features of the invention.

The amounts of resins hereinafter indicated are those of resin emulsions, and the amounts of water hereinafter are those of added ion exchange water.

Symbols used in tables below will designate the following materials.

I. Water-insoluble dye dye 1 ... CI Solvent Blue 5 (trademark "OIL BLUE 603," product of Orient Chemical Ind., Ltd.)

dye 2 ... CI Solvent Red 3I (trademark "ORASOL RED," product of Ciba-Geigy Co., Ltd.)

dye 3 ... CI Solvent Orange 45 (trademark "VALIFAST YELLOW 3108," product of Orient Chemical Ind., Ltd.)

II. Water-soluble dye dye 4 ... CI Acid Blue 9 (trademark "WATER BLUE 9," product of Orient Chemical Ind., Ltd.)

dye 5 ... CI Basic Blue 9 (trademark "AISEN METHYLENE BLUE FZ, product of Hodogaya Chemical Co., Ltd.)

III. Pigment pig 1 ... CI Pigment Blue 15:3 (trademark "FASTOGEN BLUE TGR," product of Dainippon Ink And Chemicals, Inc.)

pig 2 ... product prepared by heteroflocculation method using pig and an acrylic acid-styrene copolymer resin emulsion (trademark "MOWINYL 970," 40% in solids conc., product of Hoechst Gosei Co., Ltd.) in equal amounts (calculated as solids)

IV. Emulsion em ... acrylic acid-styrene copolymer resin emulsion (trademark "MOWINYL 970," 40% in solids conc., product of Hoechst Gosei Co., Ltd.)

em 2 ... acrylic acid-styrene copolymer resin emulsion (trademark "MOWINYL 742," 46% in solids conc., product of Hoechst Gosei Co., Ltd.)

em 3 ... acrylic resin emulsion (trademark "ACRYSET 11E," 42% in solids conc., product of Nippon Shokubai Kagakukogyo Co., Ltd.)

em 4 ... styrene resin emulsion (trademark "POLYSOL C-10," 49% in solids conc., product of Showa High Polymer Co., Ltd.)

em 5 ... acrylic acid-vinyl acetate copolymer resin emulsion trademark "POLYSOL AT-1000," 50% in solids conc., product of Showa High Polymer Co., Ltd.)

em 6 ... polyacrylic acid ester emulsion (trademark "PRIMAL AC-33" 46% in solids conc., product of Japan Acryl Co., Ltd.)

em 7 ... polyacrylic acid ester emulsion (trademark "PRIMAL AC-61," 46% in solids conc., product of Japan Acryl Co., Ltd.)

em 8 ... acrylic acid ester copolymer resin emulsion (trademark "JURIMER ET530," product of Nihon Junyaku Co., Ltd.)

em 9 ... polyvinyl acetate emulsion (trademark "NIKASOL RX-472," 50% in solids conc., product of Nippon Carbide Industries Co., Ltd.)

V. Water-soluble organic solvent gly ... glycerin
eg ... ethylene glycol
pg ... propylene glycol

EXAMPLES 1 to 7

The specified resin emulsion was mixed with the specified water-insoluble dye and stirred at room temperature for 3 hours. The resulting mixture was centrifuged to remove the dye portion unreacted with the resin. The specified water-soluble organic solvent and water were added to the supernatant. The mixture was stirred to obtain an ink.

Table 1 below shows the kind and the amount of resin emulsions, a minimum film-forming temperature of resins (MFT, °C.), the kind and amount of water-insoluble dyes, the kind and amount of water-soluble organic solvents, and the amount of water. The amounts in Table 1 are all represented by figures in parts.

Table 1 also shows the same items of information for other Examples and Comparison Examples.

COMPARISON EXAMPLES 1 to 6

Inks were prepared by the same procedure as in Example 1 to 7 with the exception of using the materials shown in Table 1.

EXAMPLE 8

The specified resin emulsion was mixed with the specified water-insoluble dye and stirred at room temperature for 3 hours. Then the mixture was centrifuged to remove the dye portion unreacted with the resin, whereby yellow and blue base inks were obtained.

These base inks were mixed together and the water-soluble organic solvent and water were added. Then the resulting mixture was stirred to obtain an ink.

COMPARISON EXAMPLES 7 and 8

The specified pigment and emulsion were kneaded by a three-roll mill, giving a paste of pigmented resin. Thereto added were the specific water-soluble organic solvent and water. Subsequently the mixture was stirred, giving an ink.

TABLE 1

| | Emulsion | | | Coloring agent | | Solvent | | Water |
|---|---|---|---|---|---|---|---|---|
| | Kind | MFT | Amount | Kind | Amount | Kind | Amount | Amount |
| Ex. 1 | em1 | 100 | 80 | dye1 | 1 | gly | 8 | 11 |
| 2 | em2 | 50 | 72 | dye1 | 1 | gly | 5 | 22 |
| 3 | em3 | 50 | 76 | dye1 | 1 | eg | 5 | 18 |
| 4 | em4 | 100 | 68 | dye1 | 1 | pg | 7 | 24 |
| 5 | em5 | 45 | 80 | dye1 | 1 | Pg | 3 | 16 |
| 6 | em1 | 100 | 64 | dye2 | 3 | eg | 7 | 26 |
| 7 | em1 | 100 | 76 | dye3 | 1.5 | pg | 7 | 15.5 |
| 8 | em1 | 100 | 40 | dye1 | 0.5 | gly | 8 | 10.7 |
| | em1 | 100 | 40 | dye3 | 0.8 | | | |
| Com. Ex. 1 | em6 | 8 | 80 | dye1 | 1 | gly | 8 | 11 |
| 2 | em7 | 8 | 80 | dye1 | 1 | gly | 8 | 11 |
| 3 | em8 | 22 | 80 | dye1 | 1 | gly | 8 | 11 |
| 4 | em9 | 18 | 80 | dye1 | 1 | gly | 8 | 11 |
| 5 | em1 | 100 | 80 | dye4 | 1 | gly | 8 | 11 |
| 6 | em1 | 100 | 80 | dye5 | 1 | gly | 8 | 11 |
| 7 | em1 | 100 | 80 | pig1 | 3 | gly | 8 | 9 |
| 8 | me1 | 100 | 70 | pig2 | 7 | gly | 8 | 15 |

TEST EXAMPLE

The inks prepared in Examples 1 to 8 and Comparison Examples 1 to 8 were evaluated in respect to the erasability and long-term stability by the following methods.

I. Erasability

The ink was filled into the ink-freely movable type container of a writing device. Writing was accomplished on paper using the device. An attempt was made to erase the written marks with a common rubber eraser. The results were assessed according to the following criteria:
A: Erasable
B: Non-erasable

II. Stability

The ink was filled into the ink-freely movable type containers of two writing devices. The devices were left to stand upright with the tips directed downward and upward, respectively, for one month. Using the two writing devices, writing was accomplished and the writing properties of inks were rated according to the following criteria. In testing the inks obtained in Comparison Examples 1 to 6, the written marks were found unerasable and a stability test was not carried out.

A: Two written marks showed no blur nor difference in the shade of color therebetween.
B: Two written marks showed a slight difference in the shade of color therebetween.
C: Two written marks showed a marked difference in the shade of color therebetween.

Table 2 below shows the colors of inks and the results of erasability and stability tests.

TABLE 2

| | Color | Erasability | Stability |
|---|---|---|---|
| Ex. 1 | Blu | A | A |
| 2 | Blue | A | A |
| 3 | Blue | A | A |
| 4 | Blue | A | A |
| 5 | Blue | A | A |
| 6 | Red | A | A |
| 7 | Yellow | A | A |
| 8 | Green | A | A |
| Comp. Ex. 1 | Blue | B | — |
| 2 | Blue | B | — |
| 3 | Blue | B | — |
| 4 | Blue | B | — |
| 5 | Blue | B | — |
| 6 | Blue | B | — |
| 7 | Blue | A | C |
| 8 | Blue | A | B |

The results shown in Table 2 reveal that the inks of the invention have excellent erasability and remarkable long-term stability.

What we claim is:

1. An erasable aqueous ink composition comprising, based on the total weight of the ink composition, 3 to 50% of a resin having a minimum film-forming temperature of not lower than 40° C., 0.01 to 10% of a water-insoluble dyes, 0.5 to 50% of a water-soluble organic solvent and 20 to 60% of water.

2. An aqueous erasable ink composition according to claim 1 wherein the resin is at least one member selected from the group consisting of acrylic resins, acryl-styrene copolymer resins, ethylene-vinyl acetate-vinyl chloride copolymer resins acryl-vinyl acetate copolymer resins and styrene resins.

3. An aqueous erasable ink composition according to claim 1 wherein the resin has a minimum film-forming temperature of not lower than 50° C.

4. An aqueous erasable ink composition according to claim 1 which comprises, based on the total weight of the ink composition, 20 to 45% of a resin having a minimum film-forming temperature of not less than 40° C., 0.01 to 10% of a water-soluble dye, 5 to 30% of a water-soluble organic solvent and 20 to 60% of water.

* * * * *